Oct. 6, 1953 — A. V. LORD — 2,654,833
RADAR BEACON TRANSMITTER
Filed Sept. 20, 1949 — 2 Sheets-Sheet 1

Inventor
ARTHUR VALENTINE LORD
By
Blair & Black, Attorneys

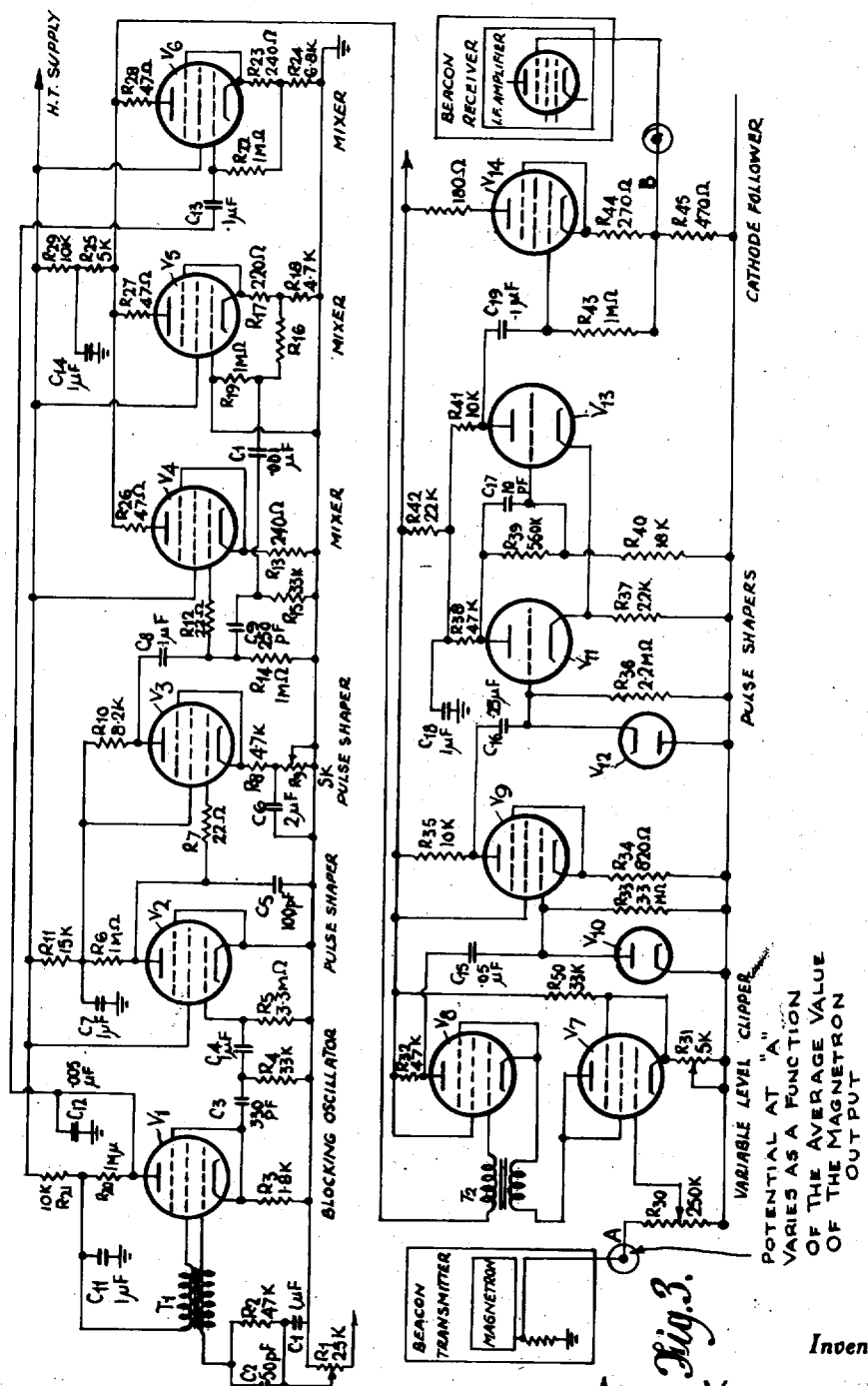

Patented Oct. 6, 1953

2,654,833

UNITED STATES PATENT OFFICE 2,654,833

RADAR BEACON TRANSMITTER

Arthur Valentine Lord, Cambridge, England, assignor to Pye Limited, Cambridge, England, a British company Application September 20, 1949, Serial No. 116,755
In Great Britain March 3, 1948

7 Claims. (Cl. 250—13)

In radar beacon systems in which the interrogator transmits a pulse to the beacon receiver which causes the beacon transmitter to transmit a series of code pulses which are received by the interrogator's receiver, it is necessary to limit the duty cycle of the beacon transmitter in order to prevent a breakdown. The duty cycle, that is the ratio of the time during which pulses are actually being transmitted to the time during which the transmitter is not transmitting pulses, may exceed its permissible maximum when the beacon is receiving a large number of signals from different interrogators. Hitherto the duty cycle has been limited by continuously reducing the sensitivity of the beacon receiver as the transmitter duty cycle approaches its permitted maximum. This has been effected by means of a D. C. bias applied to the beacon receiver, the value of which is determined by the duty cycle of the beacon transmitter. This method has the disadvantage that the beacon continues to operate with strong signals but will not respond to weak signals, thus discriminating between interrogators which may be close to or remote from the radar beacon.

The present invention has for its object to provide an arrangement for limiting the duty cycle of beacon transmitters which does not discriminate between the strength of the received interrogating pulses, and to this end the invention consists in periodically interrupting, or reducing the sensitivity of the beacon receiver by a train of variable width pulses, the width of which is a function of the duty cycle of the beacon transmitter.

In a preferred form of the invention a pulse generator is provided which generates pulses of a predetermined pulse repetition frequency but of which the pulses are of continuously variable width, say between 5% and 95% of the pulse repetition interval. The width of the pulses is controlled by a voltage derived from the beacon transmitter which is proportional to the duty cycle of the transmitter, and the output of the pulse generator is fed to blank the beacon receiver, for example by feeding blanking pulses of negative phase to a control electrode of one of the amplifying valves of the receiver, these negative blanking pulses interrupting the receiver whilst they are applied.

The pulse repetition frequency of the pulse generator is preferably remotely removed from the pulse repetition frequency of the interrogator's signals.

In order that the invention may be more fully understood one embodiment thereof will now be described by way of example with reference to the accompanying drawing, in which:

Fig. 3 is a circuit diagram of a typical arrangement.

Figure 1:
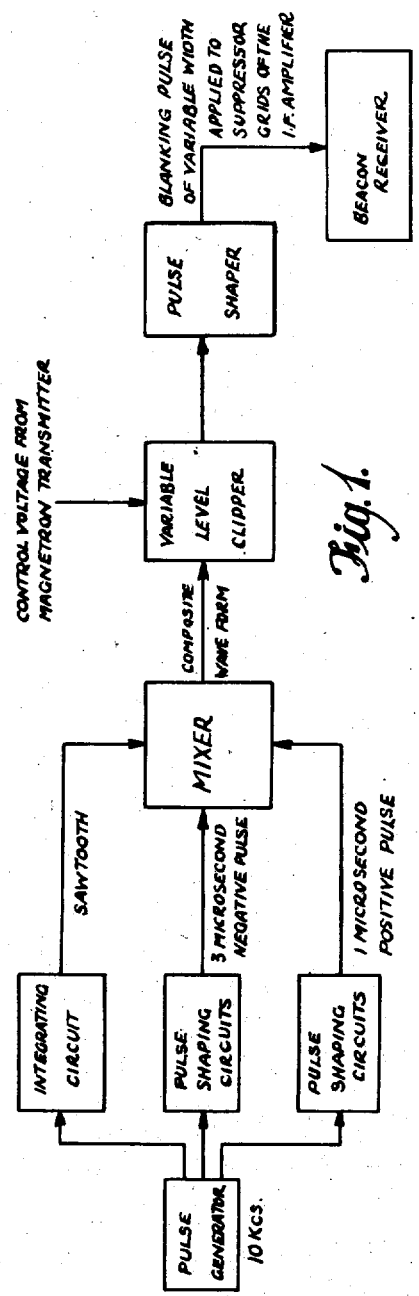
Fig. 1 is a block schematic diagram of the apparatus.
Figure 2:
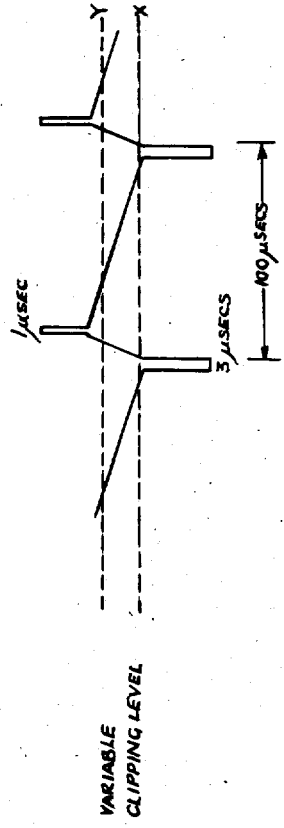
Fig. 2 is a representation of the composite waveform derived from the mixer shown in Fig. 1.

Referring to Fig. 1; the apparatus comprises a pulse generator which may operate on a frequency of the order of 10 kilocycles. Output from the pulse generator is fed to an integrating circuit and from thence to a mixer in which a sawtooth waveform, derived from the pulse generator through the integrating circuit, is mixed with pulses derived from two pulses shaping circuits which are also driven from the pulse generator. One of the pulse shaping circuits is arranged to give negative pulses of moderately short duration, for instance 3 microsecond pulses. The sawtooth waveform from the integrating circuit is also mixed with short pulses of opposite sign to those obtained from the last mentioned pulse shaping circuit. The composite waveform obtained from the mixer is shown diagrammatically in Fig. 2. A 3 microsecond negative pulse is followed closely by a 1 microsecond positive pulse which is followed by a sawtooth waveform which extends over the remainder of the 100 microsecond cycle between successive repetitions.

The composite waveform from the mixer is fed to a variable level clipper in which the clipping level is controlled by a potential derived from the beacon transmitter and is a function of the duty cycle of the transmitter and which can, in the case of a magnetron transmitter, conveniently be obtained from a resistor connected in the cathode lead of the magnetron. From the variable level clipper the waveform passes through a pulse shaper and is thence fed to the beacon receiver to paralyse it or interrupt it or reduce its sensitivity for a period during each cycle which is a function of the control voltage derived from the beacon transmitter. For instance, the output waveform may be arranged to apply a paralysing negative bias to the suppressor grids of one or more valves forming the intermediate frequency amplifier of the beacon receiver. The positive and negative pulses in the waveform ensure that the receiver is never operative for the whole cycle nor inoperative for the whole cycle.

One circuit arrangement of a typical embodiment is shown in Fig. 3 in which the valve V1 is a blocking oscillator, the frequency of oscillation of which can be adjusted to a predetermined value by a potentiometer R1, by means of which the potential applied to the control grid of the valve V1 can be altered. The slider of the potentiometer R1 is by-passed to earth by a capacitor C1 and the grid winding of the blocking oscillator transformer T1 is fed therefrom through a resistor R2 which is by-passed by a capacitor C2.

Output is taken from the cathode of the valve V1 across the cathode resistor R3 through a differentiating network comprising capacitators C3 and C4 and resistors R4 and R5 to the control grid of a valve V2. The valve V2 is followed by a valve V3, the valves V2 and V3 together forming pulse shaping circuits. The anode of the valve V2 has a load resistor R6 and is D. C. coupled to the grid of the valve V3 through a resistor R7. The grid of the valve V3 is by-passed to earth by a capacitor C5. In the cathode circuit of the valve V3 is connected a fixed cathode resistor R8 and also a variable resistor R9 by-passed by a capacitor C6. The variable resistor R9 acts as a gain control. In the anode circuit of the valve V3 is connected a load resistor R10 fed from a high tension supply de-coupled by a resistor R11 and capacitor C7, this high tension supply is also used for V2.

From the anode of the valve V3 the waveform is fed through a capacitor C8, through a suppressor resistor R12, to the control grid of a valve V4. The valve V4 has a cathode resistor R13. Output is also taken through a capacitor C8 through a delay network comprising resistors R14, 15 and 16 and capacitators C9 and C10 to the junction point of resistors R17 and R18 forming the cathode load of the valve V5. The control grid of the valve V5 is connected to earth and through a resistor R19 to the capacitor C10.

The anode of the valve V1 is connected to a load resistor R20 fed from a high tension supply de-coupled by a resistor R21 and capacitor C11. A capacitor C12 by-passes the anode of the valve V1 to earth. Output from the anode of the valve V1 is taken to the control grid of a further valve V6 through a capacitor C13, the grid of the valve V6 being connected through a grid leak R22 to a tapping point on the cathode load consisting of resistors R23 and R24.

The anodes of the valves V4, V5 and V6 are each connected to a common load resistor R25 through suppressor resistors R26, R27 and R28 respectively. The high tension supply for these valves is de-coupled by a resistor R29 and capacitator C14. The valves V4, V5 and V6 act as a mixer stage in which a sawtooth waveform derived from the anode of V1 is mixed with 3 microsecond negative pulses derived through the pulse shaper valves V2 and V3 from the cathode of the valve V1 and also with 1 microsecond positive pulses derived from the cathode of V1 through the pulse shaper valves V2 and V3 and the valve V5.

The control grid of a valve V7 is connected to the slider of a potentiometer R30, the upper end of which is connected to a lead A by which a control voltage obtained from a resistor connected in the cathode lead of a magnetron incorporated in the beacon transmitter is applied. The potentiometer R30 may be used to control the amplitude of the control voltage applied to the grid of the valve V7. Connected in the cathode lead of the valve V7 is a variable resistor R31 which carries the current of a bleeder resistance R50 and operates as a gain control. The anode of the valve V7 is coupled through a transformer T2 to the control grid of a valve V8, to which the waveform obtained from the mixer valves V4, V5 and V6 is also applied. The valves V7 and V8 act as a variable level clipper.

The valve V8 has an anode load resistor R32, output being taken from this anode through a capacitor C15 to the control grid of a valve V9. This control grid is connected to a grid leak R33 and also to the anode of a diode valve V10, the cathode of which is connected to earth. The valve V9 has a cathode resistor R34 and an anode load R35. The anode of the valve V4 is coupled through a capacitor C16 to the grid of a triode valve V11, having a grid leak R36 shunted by a second diode valve V12, the cathode of which is connected to the grid of the valve V11. The valve V12 has a cathode resistor R37 and an anode load R38. The anode of the valve V11 is directly coupled to the grid of a triode valve V13 by a resistor R39 by-passed by a capacitor C17, said grid also being provided with a grid leak R40. Connected to the anode of the valve V13 is an anode load R41 which is fed from a high tension supply in common with R38, this supply being de-coupled by a resistor R42 and capacitator C18. The valves V9, V10, V11, V12 and V13 operate as pulse shapers.

The control grid of a cathode follower output valve V14 is connected through a capacitor C19 to the anode of the valve V13. The control grid of the valve V14 is connected through a grid leak R43 to a tapping point on the cathode load comprising resistors R44 and R45. Output from the valve V14 is taken from this tapping point through a lead B to provide a paralysing negative bias for application to the suppressor grid of one or more valves in the intermediate frequency amplifier of the beacon receiver or in any other convenient way to reduce the sensitivity.

In operation the blocking oscillator valve V1 controls the frequency of repetition of the waveform applied to paralyse the beacon receiver. This frequency may be pre-set, for instance, to 10 kilocycles which gives a cycle time of 100 microseconds or to any other frequency which should preferably be remote from the repetition frequency of the beacon transmitter. The output from the mixer valves V4, V5 and V6 consists of the composite waveform shown in Fig. 2. The variable level clipper valves V7 and V8 controlled by the control voltage applied through the lead A from the magnetron in the beacon transmitter respond to the magnitude of this control voltage to vary the width of the pulses applied through the lead B to paralyse the beacon receiver. When the clipping level is low as indicated by the line X in Fig. 2 the beacon receiver is only paralysed for relatively short periods approximating to the duration of the three microsecond pulses, the receiver being operative throughout the rest of the cycle. When, however, the duty cycle of the transmitter approaches the maximum permitted value the clipping level is raised, for instance, to the line Y in Fig. 2 so that a paralysing bias is applied to the receiver for a relatively large proportion of the cycle.

While one particular embodiment has been described by way of example it has to be understood that modifications within the scope of the appended claims may be made.

I claim:

1. In a radar beacon system, consisting of a beacon receiver and a beacon transmitter, apparatus providing a train of variable width pulses for reducing the sensitivity of the beacon receiver periodically in response to a control potential, comprising a pulse generator, an integrating circuit connected to said pulse generator, a pulse shaping circuit also connected to said pulse generator, a mixer circuit for mixing the outputs from the integrating circuit and the pulse shaping circuit to produce a combined waveform, a variable level clipper circuit for clipping said combined waveform so as to provide variable width pulses, means for deriving a control potential from the beacon transmitter in response to the duty cycle of the transmitter, means for applying the control potential to the variable level clipper circuit and thereby controlling the clipping of the combined waveform and means for applying the variable width pulses to the beacon receiver.

2. A system according to claim 1, wherein the beacon transmitter includes a magnetron, the control potential being obtained from a resistance connected in the cathode lead thereof.

3. A system according to claim 1, wherein the variable width pulses are applied to reduce the sensitivity of the intermediate frequency amplifier of the receiver.

4. In a radar beacon system comprising a beacon receiver and a beacon transmitter, apparatus for reducing the sensitivity of the beacon receiver as a function of the duty cycle of the beacon transmitter, comprising means for generating a train of pulses, means controlled by the duty cycle of the transmitter for varying the width of the pulses, and means for reducing the sensitivity of the receiver in response to the pulses of variable width.

5. In a radar beacon system, consisting of a beacon receiver and a beacon transmitter including a magnetron having a cathode, apparatus for reducing the sensitivity of the beacon receiver periodically in response to a control potential, comprising means for generating a train of pulses, a resistor connected between the cathode of said magnetron and a point of fixed potential, means for producing a control potential across said resistor in response to the duty cycle of the transmitter, means for applying said potential to said train of pulses to vary the width of said pulses, and means for reducing the sensitivity of the receiver in response to the pulses of variable width.

6. In a radar beacon system, consisting of a beacon receiver and a beacon transmitter, apparatus providing a train of variable width pulses for reducing the sensitivity of the beacon receiver periodically in response to a control potential, comprising means for generating a sawtooth waveform, means for producing a train of positive pulses, means for producing a train of negative pulses, means for mixing said positive and negative pulses with said sawtooth waveform, to produce a combined waveform, means for producing a control potential from the transmitter in response to the duty cycle of the transmitter, means for applying said potential to said combined waveform to vary the width of the pulses, and means for reducing the sensitivity of the receiver in response to the pulses of variable width.

7. In a radar beacon system, consisting of a beacon receiver and a beacon transmitter, apparatus providing a train of variable width pulses for reducing the sensitivity of the beacon receiver periodically in response to a control potential, comprising means for generating a train of pulses, means for producing a control potential from the transmitter in response to the duty cycle of the transmitter, a variable level clipping circuit, means for applying said train of pulses to the variable level clipping circuit, means for applying the control potential to the variable level clipping circuit and thereby controlling the width of the train of pulses, and means for reducing the sensitivity of the receiver in response to the pulses of variable width.

ARTHUR VALENTINE LORD.

References Cited in the file of this patent

UNITED STATES PATENTS

| Number | Name | Date |
| --- | --- | --- |
| 2,209,507 | Campbell | July 30, 1940 |
| 2,391,776 | Fredendall | Dec. 25, 1945 |
| 2,413,023 | Young, Jr. | Dec. 24, 1946 |
| 2,421,016 | Deloraine et al. | May 27, 1947 |
| 2,429,513 | Hansen et al. | Oct. 21, 1947 |
| 2,530,096 | Sudman | Nov. 14, 1950 |